US009728927B2

United States Patent
Kovacs et al.

(10) Patent No.: US 9,728,927 B2
(45) Date of Patent: Aug. 8, 2017

(54) METHOD FOR WELDING A CABLE TO A TERMINAL

(75) Inventors: Tamas Kovacs, Vertesszolos (HU); Peter Nagy, Budapest (HU)

(73) Assignee: Delphi International Operations Luxembourge, Sarl, Luxembourg (LU)

( * ) Notice: Subject to any disclaimer, the term of this patent is extended or adjusted under 35 U.S.C. 154(b) by 606 days.

(21) Appl. No.: 14/127,694

(22) PCT Filed: Jun. 29, 2012

(86) PCT No.: PCT/EP2012/062777
§ 371 (c)(1),
(2), (4) Date: Feb. 14, 2014

(87) PCT Pub. No.: WO2013/023830
PCT Pub. Date: Feb. 21, 2013

(65) Prior Publication Data
US 2014/0182127 A1 Jul. 3, 2014

(30) Foreign Application Priority Data

Jul. 1, 2011 (WO) .................. PCT/IB2011/001858

(51) Int. Cl.
*H01R 43/02* (2006.01)
*H01R 9/03* (2006.01)
(Continued)

(52) U.S. Cl.
CPC ......... *H01R 43/0221* (2013.01); *B23K 26/32* (2013.01); *H01R 9/032* (2013.01);
(Continued)

(58) Field of Classification Search
CPC   H01R 43/0221; H01R 43/0263; H01R 9/032; B23K 26/3213; B23K 26/32;
(Continued)

(56) References Cited

U.S. PATENT DOCUMENTS

| 4,774,394 A |   | 9/1988 | Lemke |   |
|---|---|---|---|---|
| 4,966,565 A | * | 10/1990 | Dohi | ...................... H01R 4/029 |
|   |   |   |   | 29/860 |

(Continued)

FOREIGN PATENT DOCUMENTS

| JP | 59107786 A | 6/1984 |
|---|---|---|
| JP | 11 214113 A | 8/1999 |

(Continued)

OTHER PUBLICATIONS

International Search Report dated Sep. 12, 2012.

*Primary Examiner* — Peter DungBa Vo
*Assistant Examiner* — Azm Parvez
(74) *Attorney, Agent, or Firm* — Robert J. Myers

(57) ABSTRACT

The invention is a welding method for welding a cable to a terminal, the cable comprising multiple strands and an insulating sheath around the multiple strands, the method comprising the steps of removing the insulating sheath from an end section of the cable, pressing the multiple strands to the terminal with a pressing mechanism, and making at least one welding connection between the multiple strands and the terminal by applying at least one pulse of a laser onto the end section of the cable, and removing the pressing mechanism.

8 Claims, 7 Drawing Sheets

(51) Int. Cl.
  *B23K 26/32* (2014.01)
  *B23K 103/12* (2006.01)
(52) U.S. Cl.
  CPC ...... *H01R 43/0263* (2013.01); *B23K 2203/12* (2013.01); *Y10T 29/49179* (2015.01)
(58) Field of Classification Search
  CPC ........... B23K 2203/08; Y10T 29/49179; Y10T 29/49174; Y10T 29/49002
  USPC ........... 29/860, 857, 825, 592.1; 219/121.64, 219/121.63, 121.6
  See application file for complete search history.

(56) References Cited

U.S. PATENT DOCUMENTS

| | | | |
|---|---|---|---|
| 5,080,278 A * | 1/1992 | Streckenbach | G21F 5/015 219/100 |
| 5,269,056 A | 12/1993 | Yang et al. | |
| 5,541,365 A | 7/1996 | Sugiura et al. | |
| 5,935,463 A * | 8/1999 | Sugiura | B23K 26/20 219/121.64 |
| 6,061,595 A * | 5/2000 | Safarevich | A61N 1/05 439/874 |
| 6,531,676 B2 | 3/2003 | Schwemmer et al. | |
| 7,128,620 B2 | 10/2006 | Maura et al. | |
| 7,705,265 B2 * | 4/2010 | Asakura | H01R 43/0221 219/121.64 |
| 2009/0197017 A1 * | 8/2009 | Tanaka | H01L 51/0013 427/596 |
| 2011/0076888 A1 * | 3/2011 | Fernandez | H01M 10/48 439/620.01 |

FOREIGN PATENT DOCUMENTS

| | | |
|---|---|---|
| JP | 2007 305314 A | 11/2007 |
| JP | 2007326140 A * | 12/2007 |

* cited by examiner

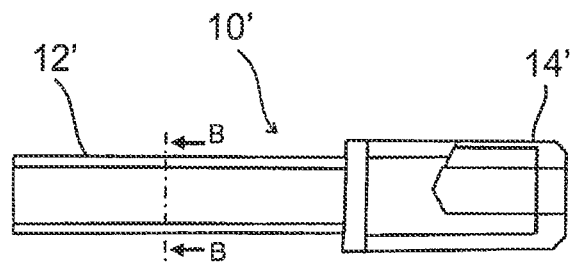
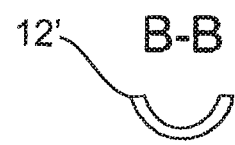
Fig. 8   Fig. 9
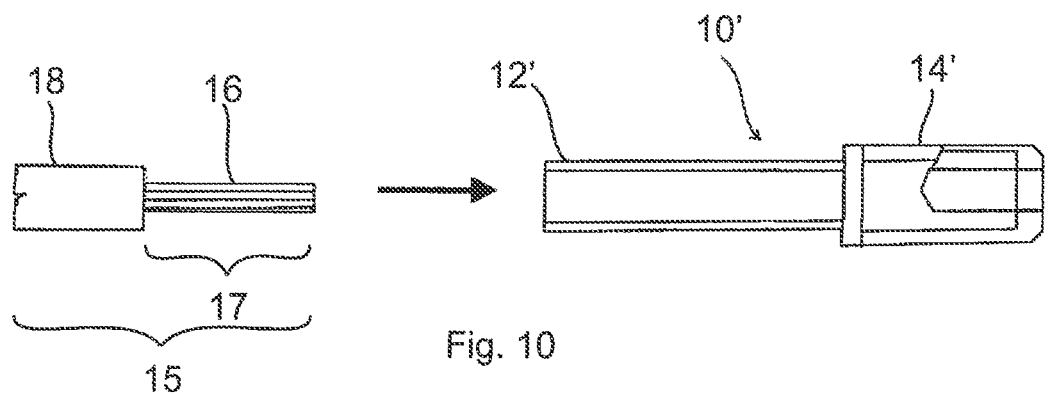
Fig. 10
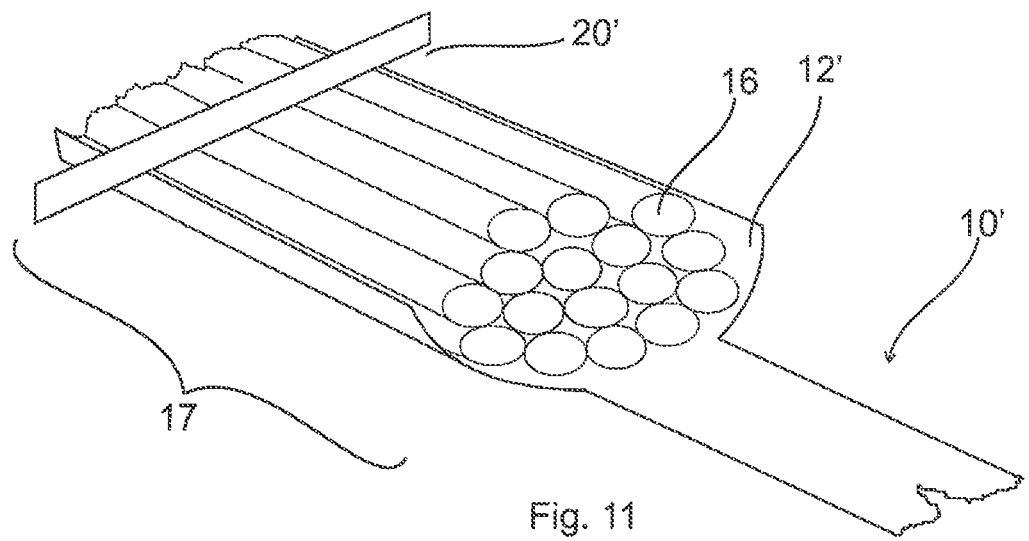
Fig. 11

METHOD FOR WELDING A CABLE TO A TERMINAL

CROSS-REFERENCE TO RELATED APPLICATION

This application is a national stage application under 35 U.S.C. §371 of PCT Application Number PCT/EP2012/062777 having an international filing date of Jun. 29, 2012, which designated the United States, which PCT application claimed the benefit of PCT Application Number PCT/IB2011/001858, filed Jul. 1, 2011, the entire disclosure of each of which are hereby incorporated herein by reference.

TECHNICAL FIELD OF THE INVENTION

The invention relates to a method for welding a cable to a terminal by means of at least one pulse of a laser.

BACKGROUND OF THE INVENTION

A cable with multiple strands can be welded to a terminal by means of several welding techniques, e.g. compaction welding. By the development of laser techniques, some solutions for laser welding of cables or wires to terminals were developed, which are discussed hereunder.

In U.S. Pat. No. 4,774,394 a laser welding technique is disclosed, wherein a single metallic conductor wire is welded to a U-shaped metallic fixture using a laser. In the method the end section of a single wire is placed into a fixture and is welded to it by means of a laser beam directed to the end of the wire.

In U.S. Pat. No. 5,541,365 and JP 59-1 07786 A laser welding methods are disclosed, in which a single wire is welded to a U-shaped terminal by means of a laser beam.

In U.S. Pat. No. 6,531,676 B2 a laser welding method is disclosed, in which a single wire is welded to a U-shaped carrier or terminal made of copper.

In U.S. Pat. No. 7,128,620 B2 a laser welding method of a cable of multiple strands to a terminal is disclosed. The multiple strands are compacted and shaped before inserted into a slot of the terminal.

In U.S. Pat. No. 4,966,565 and U.S. Pat. No. 7,705,265 B2 laser welding methods are disclosed, wherein the multiple strands of a cable are crimped to the terminal before the strands are welded to it. The target point of the laser beam is chosen differently in the two documents.

The methods disclosed in the above documents have several disadvantages. On the one hand, in the prior art methods a groove or a recess is needed for the laser welding even in the simplest case of a single wire. On the other hand, cables of multiple strands are laser-welded only after an additional compaction or crimping step used for keeping each of the strands together.

In the light of the known methods disclosed in the above documents, it is an object of the invention to provide a method for laser welding of a cable of multiple strands to a terminal, where neither crimping of the strands nor other shaping or compaction of the strands is needed. It is also an object of the invention to provide a laser welding method which is exempt from the disadvantages of the prior art solutions.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

In accordance with one embodiment of this invention, a welding method for welding a cable to a terminal, wherein the cable comprises comprising multiple strands is provided. The method includes the steps of pressing the multiple strands to the terminal with a pressing mechanism, making at least one welding connection between the multiple strands and the terminal by applying at least one pulse of a laser onto the end section of the cable, and removing the pressing mechanism.

The method may include applying a first pulse of the laser wherein the diameter of an impact area of the first pulse of the laser is larger than the overall width of the pressed down multiple strands. The impact area of the first pulse of the laser may cover the end of the cable. The first laser pulse may be applied with such a power, that all of the multiple strands in the end section of the cable and maximum 50% of a cross section of the terminal are melted.

According to another embodiment, a second pulse of the laser may be applied onto the end section of the cable, wherein the diameter of an impact area of the second pulse of the laser is larger than the overall width of the pressed down multiple strands. The impact area of the second pulse of the laser may have no overlap with the impact area of the first pulse of the laser or the impact area of the second pulse of the laser may overlap with the impact area of the first pulse of the laser. The power of the second pulse of the laser may be higher than the power of the first pulse of the laser. The second pulse of the laser may be applied with such a power, that all of the multiple strands in the end section of the cable and maximum 50% of a cross section of the terminal are melted.

According to yet another embodiment, a terminal with a flat welding surface or a terminal with a welding surface of a U-shaped cross section is applied. The terminal and all of the multiple strands may be made of copper. During welding an inert gas, preferably argon, is applied around the terminal and the multiple strands.

Further features and advantages of the invention will appear more clearly on a reading of the following detailed description of the preferred embodiment of the invention, which is given by way of non-limiting example only and with reference to the accompanying drawings.

BRIEF DESCRIPTION OF THE SEVERAL VIEWS OF THE DRAWING

The present invention will now be described, by way of example with reference to the accompanying drawings, in which:

FIG. 8 is a top view of a second type of terminal used in the welding method in accordance with one embodiment;

FIG. 9 is a sectional view of the terminal according to FIG. 8 taken along plane B-B;

FIG. 10 is a top view similar to FIG. 2, with a terminal according to FIG. 8;

FIG. 11 is a three-dimensional schematic view illustrating a pressing step of a method in accordance with one embodiment;

DETAILED DESCRIPTION OF THE INVENTION

The inventive method was especially developed for terminals made of copper and for copper cables having multiple strands, but a person skilled in the art is aware that the method can be applied to terminals and cables made of other materials. The terminal and the cable used in the method according to the invention can be optionally tinned. The purpose of the terminal is to transmit current from the cable to a connection which is provided by a head of the terminal.

The laser which is applied in the inventive method is operated in pulse mode. In pulse mode the contraction of the melted material can be avoided. The contraction can be a consequence of the presence of surface tension. Creation of sphere-like expansions in the end of the strands of the cable can also be a consequence of using a laser in continuous mode in the welding method and could impede the manufacturing method of a welding connection.

The inventive method has the advantage that no crimping with the material of the terminal itself is applied on the multiple strands of the cable to be welded. Instead of crimping, only a temporary pressing is applied to the multiple strands by means of a pressing mechanism, which pressing mechanism is removed after the welding connection has been created. The welding connection obtained by the inventive method comprises on one hand melted material of the multiple strands and on the other hand some melted material of the terminal itself, but an excessive melting of the material of the terminal is preferably avoided in the method according to the invention as detailed below.

Figure 1:
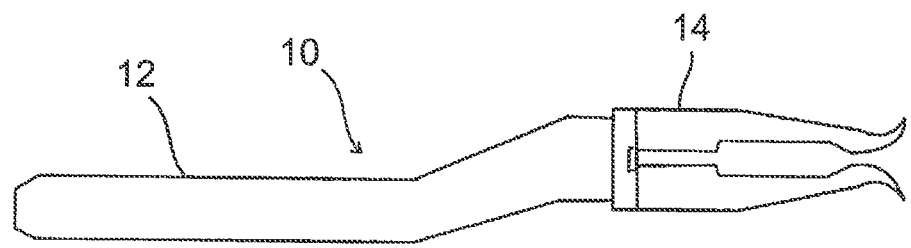
FIG. 1 is a side view of a first type of terminal used in the welding method in accordance with one embodiment.

FIG. 1 shows a non-limiting example of a terminal 10 in an embodiment of the method. The terminal 10 has a flat welding surface 12 and a terminal head 14. The usability of terminals 10 with flat welding surface 12 allows the method to be easily generalized to many kinds of existing terminals, while there are no restrictive features which have to be fulfilled by the terminal in the inventive method.

Figure 2:
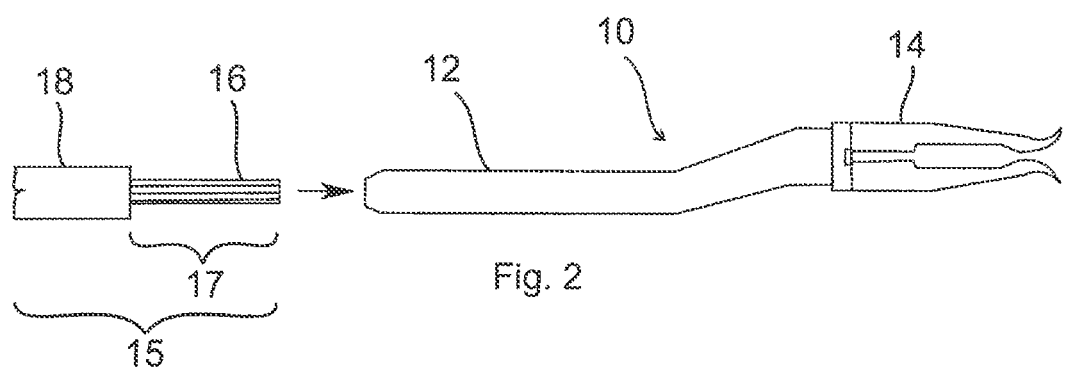
FIG. 2 is a side view illustrating a step of a method in accordance with one embodiment.

FIG. 2 shows the first step of an embodiment of the laser welding method according to the invention using the terminal 10 with the welding surface 12. In this step a cable 15 is positioned on the terminal 10, especially on the welding surface 12 of the terminal 10. The cable 15 comprises multiple strands 16 and an insulating sheath 18 around the multiple strands 16. Before the illustrated step of the method, the insulating sheath 18 is removed from an end section 17 of the cable 15, and only that end section 17 is positioned to the welding surface 12.

Figure 3:
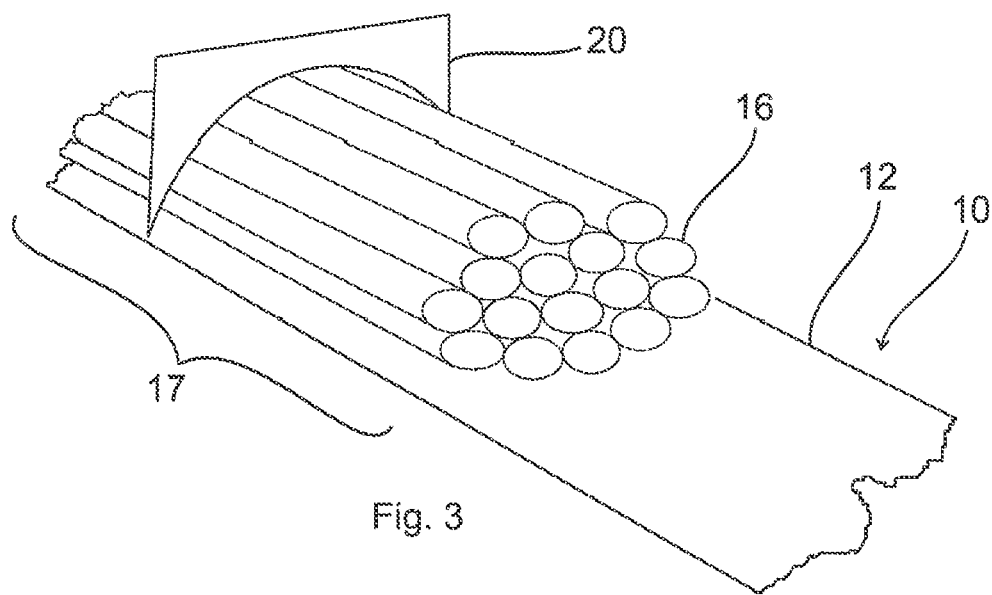
FIG. 3 is a three-dimensional schematic view illustrating a processing step of a method in accordance with one embodiment.

FIG. 3 shows a pressing step of the laser welding method. In this step, the multiple strands 16 are pressed down to the welding surface 12 with a pressing mechanism 20. By means of the pressing mechanism 20, the multiple strands 16 can be ordered on the welding surface 12 and preferably the appearance of loose strands can be avoided. It is emphasized that no crimping mechanism is applied in the method, i.e. the multiple strands 16 are not pressed together by the material of the terminal itself. Therefore, advantageously, the method is simplified compared to prior art solutions, while a crimping or compaction step is missing from the inventive method. Some kind of pressing mechanism is used in all of the embodiments. The pressing mechanism 20 has a curved pressing surface in this embodiment to order the multiple strands 16 laying on the welding surface 12.

Figure 4:
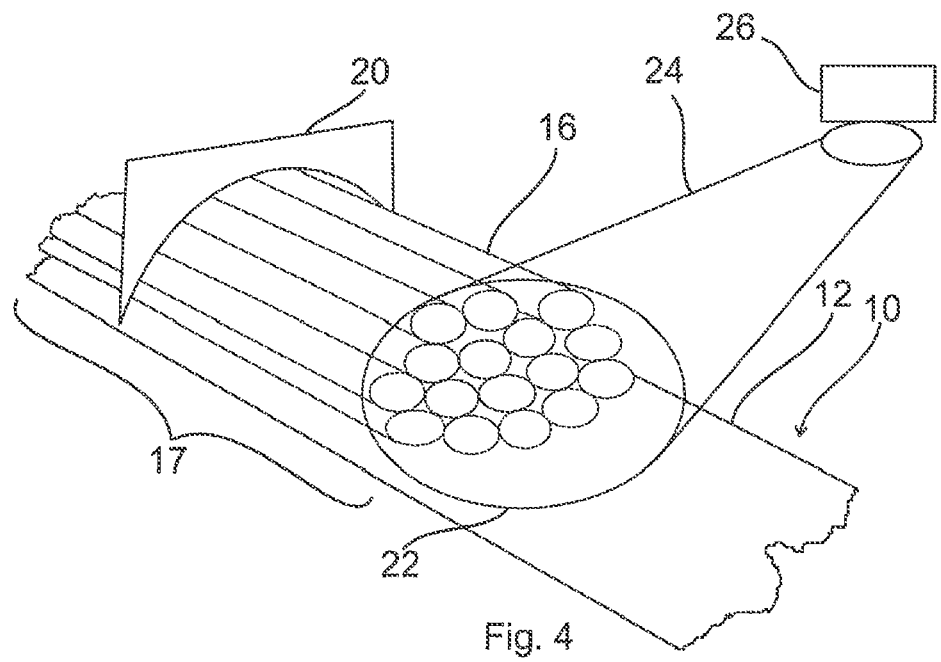
FIG. 4 is a three-dimensional schematic view illustrating a welding step of a method in accordance with one embodiment.

FIG. 4 shows a step of the laser welding method, wherein a first pulse of laser 26 is applied to melt the multiple strands 16 in the end section 17 of the cable 15. The pulse of the laser 26 is illustrated by a laser beam 24 in FIG. 4. The laser beam 24 has an impact area 22 on the multiple strands 16 and on the nearby parts of the terminal 10. The diameter of the impact area 22 of the first pulse of the laser 26 is larger than the overall width of the pressed down multiple strands 16. In this case, it is ensured that all of the multiple strands 16 are melted. The overall width of the multiple strands 16 is larger when the multiple strands 16 are pressed down than without pressing mechanism. Adjusting the size of the diameter of the impact area 22 to be larger than the overall width of the pressed down multiple strands 16 also helps to avoid the appearance of loose strands 16 after the welding has been finished. Preferably, the impact area 22 of the first pulse of the laser 26 covers the end of the cable 15, which also helps to avoid loose strands. The appearance of loose strands is most probable at the end of the cable 15, because that is the farthest part of the cable 15 from the pressing mechanism 20. If the impact area 22 covers the end of the cable 15 and, additionally, the diameter of it is larger than the overall width of the pressed down multiple strands 16, eventual loose strands will be melted by the laser beam 24 and will form a part of the welding connection.

Figure 5:
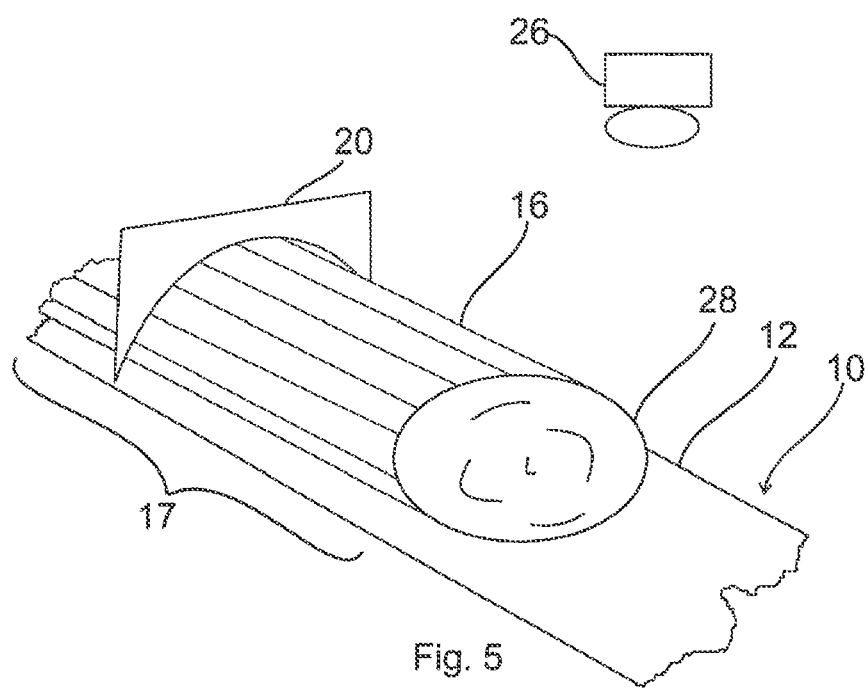
FIG. 5 is a three-dimensional schematic view illustrating a welded state in accordance with one embodiment.

FIG. 5 shows a welded state. By the application of the pulse of the laser 26 on the end section 17 of the cable 15, the material of the multiple strands 16 and maximum 50% of the cross section of the terminal 10 is melted after the laser beam 24 was applied on the cable 15. When the melted material becomes solid again, i.e. cools down, a welding connection 28 is created between the terminal 10 and the multiple strands 16. It is desired for the welding connection 28 to connect all of the multiple strands 16 to the terminal 10 without any loose strands. This requirement can be met when the impact area 22 of the pulse of the laser 26 covers the end of the cable 15 and the diameter of the impact area 22 is larger than the width of the pressed down multiple strands 16, as mentioned above. After the welding connection 28 has been created, the pressing mechanism 20 is removed.

The welding connection 28 created between the multiple strands 16 and the terminal 10 can be strengthened in another embodiment by making a second welding connection 28' between the terminal 10 and the multiple strands 16. In this embodiment, the second welding connection 28' can be created by the application of two further steps illustrated in FIGS. 6 and 7 after the steps of FIGS. 2 to 5.

Figure 6:
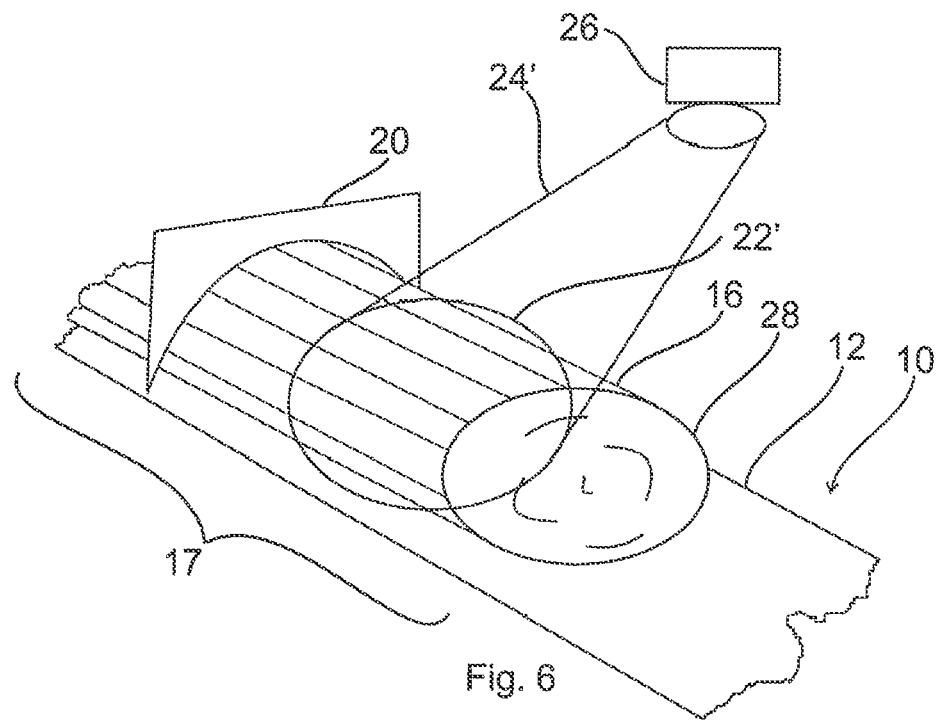
FIG. 6 is a three-dimensional schematic view illustrating a further welding step in accordance with another embodiment.

FIG. 6 shows an additional welding step, wherein a second pulse of laser 26 is preferably applied on the end section 17 of the cable 15, where the insulating sheath 18 is removed. The second pulse of the laser 26 is illustrated by a laser beam 24' in FIG. 6. The laser beam 24' has an impact area 22' on the multiple strands 16 and the nearby parts of the terminal 10, the diameter of which is larger than the overall width of the pressed down multiple strands 16, similarly to impact area 22. Two options can be distinguished in the application of the second laser beam 24'.

In the case of a first option, the impact area 22' of the second pulse of the laser 26 has no overlap with the impact area 22 of the first pulse of the laser 26. In this case separate welding connections are created between the cable 15 and the terminal 10. Loose strands can advantageously be avoided in this case, because when the creation of a first welding connection results in a loose strand, than, by the creation of a second welding connection, this can be melted to the welding connection.

In the case of a second option, the impact area 22' has an overlap with the impact area 22. As a consequence of melting the material of the multiple strands 16, the reflexivity thereof will be higher than before. When impact area 22 of the laser beam 24 and impact area 22' of the laser beam 24' have an overlap, the higher reflection properties of the previously created welding connection 28 can cause the second laser pulse be partly reflected by the surface of the welding connection 28. To compensate the power reflected by the existing welding connection 28 of high reflectivity, the power of the second pulse of the laser 26 is preferably higher than the power of the first pulse of the laser 26. In the case of an overlap, an overall smaller welding connection can be created between the parts than by the first option, i.e. smaller parts of the multiple strands 16 and the terminal 10 become rigid. It is to be avoided to melt more than 50% of the cross section of the terminal 10; the power of the first and the second laser pulses has to be adjusted accordingly.

It is preferred in all of the embodiments of the method, that both the first and the second pulse of the laser 26 is applied with such a power, that all of the multiple strands 16 in the end section 17 of the cable 15 and maximum 50% of the cross section of the terminal 10 are melted. Experiments by the inventors revealed that if more than 50% of the cross section of the terminal 10 was melted and became solid again, then the terminal 10 became rigid and easily breakable. If maximum 50% of the cross section is melted, the stability and durability of the terminal 10 remains acceptable.

Figure 7:
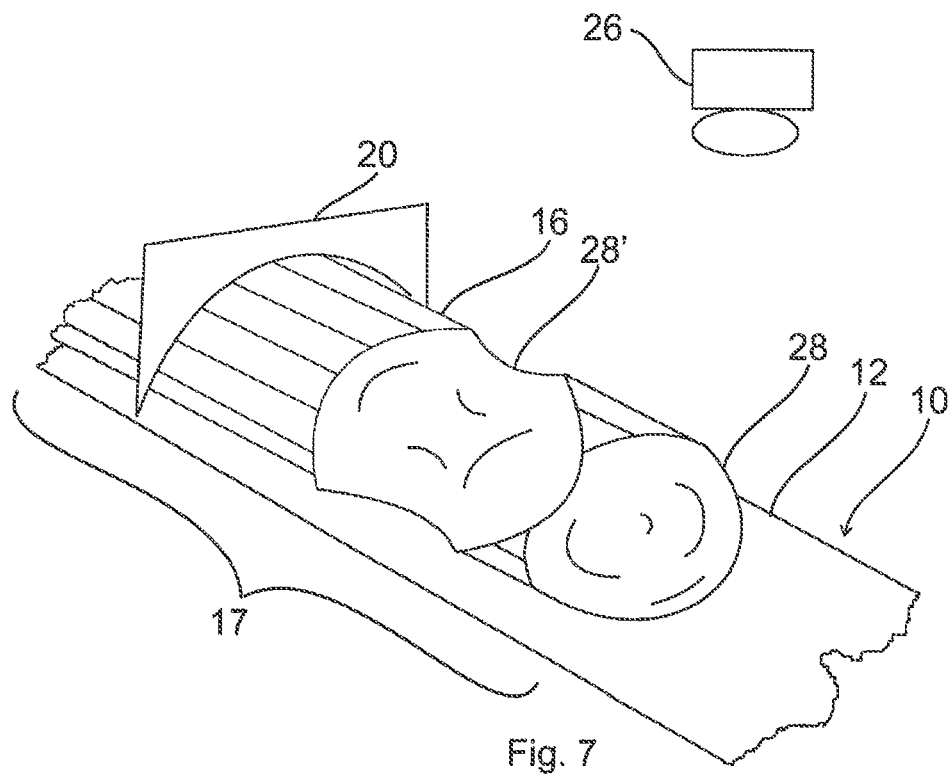
FIG. 7 is a three-dimensional schematic view illustrating a welded state obtained by the step of FIG. 6.

FIG. 7 shows a welded state, in which a second welding connection 28' is created between the terminal 10 and the multiple strands 16 by applying the second pulse. In FIGS. 6 and 7, the multiple strands 16 are pressed by means of the pressing mechanism 20 similarly to the steps illustrated in FIGS. 3 to 5; the pressing mechanism 20 is removed after the welding connection 28' has been created.

FIG. 8 shows another terminal 10' that can be used in further embodiments of the method. The terminal 10' has a welding surface 12' and a terminal head 14'. FIG. 9 shows a cross-section of the welding surface 12' taken on plane B-B. It can be clearly seen on FIG. 9 that the welding surface 12' has a U-shaped cross-section in the B-B plane. The application of terminal 10' with welding surface 12' of U-shaped cross-section further decreases the possibility of the appearance of a loose strand. Terminal 10' also has the advantage that the multiple strands 16 are more surrounded by the material of the terminal 10', resulting in a more compact welding joint and in a better efficiency in avoiding loose strands.

The terminal used in the method is not restricted to the types shown in FIGS. 1 and 8, i.e. to the terminal with the flat welding surface or to the terminal with the U-shaped welding surface, but any type of suitable terminals can be used.

FIG. 10 shows the first step of the laser welding method using terminal 10'. In this embodiment the terminal 10' has a welding surface 12' of U-shaped cross section (as shown in FIG. 9). In this first step the end section 17 of the cable 15 is positioned to the welding surface 12' of terminal 10'. The application of the terminal 10' has the advantage, that the multiple strands 16 in the end section 17 of the cable 15 are partly surrounded by the welding surface 12'. The curved-up parts of the welding surface 12' of U-shaped cross section are called walls. The application of welding surface 12' of U-shaped cross-section helps to avoid the appearance of loose strands.

FIG. 11 shows a pressing step of this embodiment, wherein the multiple strands 16 of the end section 17 of the cable 15 are pressed down by means of a pressing mechanism 20' to the terminal 10' into its welding surface 12' forming a groove-like form receiving the multiple strands 16.

Figure 12:
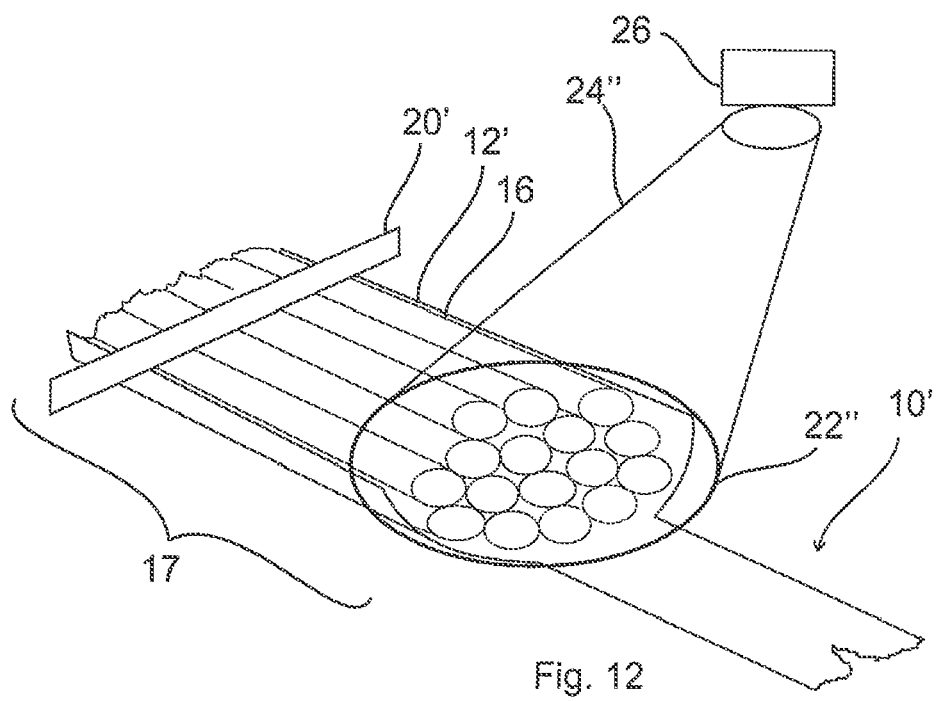
FIG. 12 is a three-dimensional schematic view illustrating a welding step of a method in accordance with one embodiment.

FIG. 12 shows a welding step of this embodiment of the method, wherein a first pulse of laser 26 is applied to melt the end section 17 of the cable. The pulse of laser 26 is illustrated by laser beam 24", which has an impact area 22" on the multiple strands 16 and the nearby parts of the terminal 10'. The diameter of the impact area 22" of the first pulse of the laser 26 is larger than the overall width of the pressed down multiple strands 16, which is limited by the width of the welding surface 12'. The impact area 22" of the first pulse of the laser 26 covers the end of the cable 15.

Figure 13:
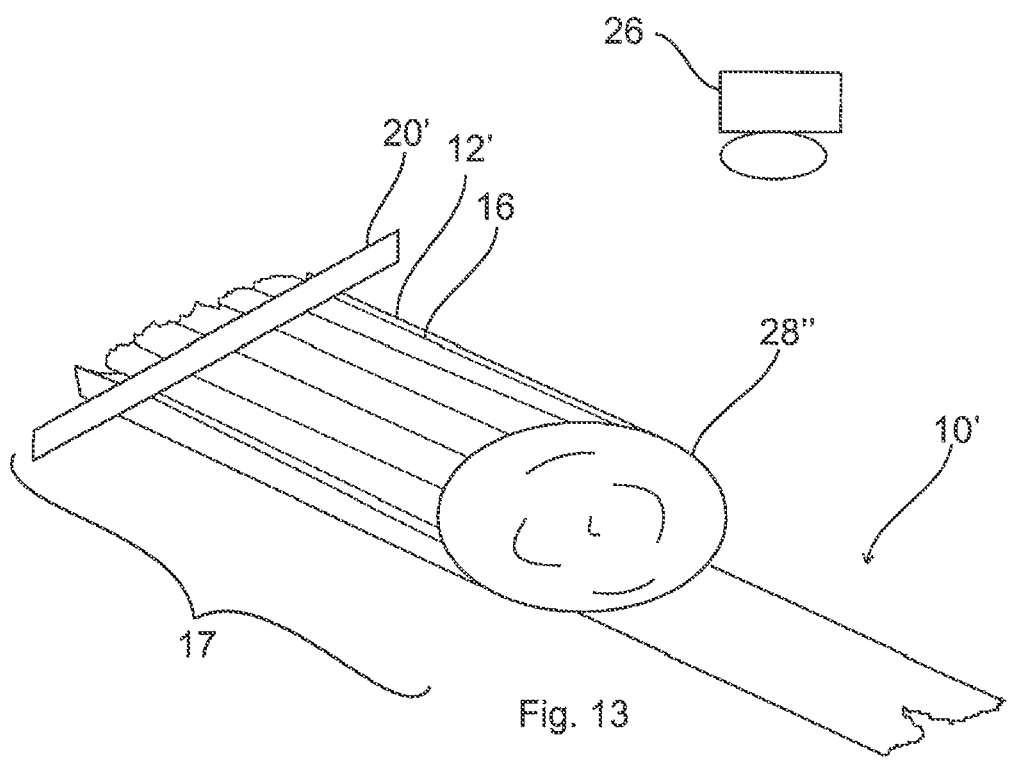
FIG. 13 is a three-dimensional schematic view illustrating a welded state in accordance with one embodiment.

FIG. 13 shows a welded state, in which a welding connection 28" created between the terminal 10 and the multiple strands 16. By the application of a laser beam 24" of impact area 22" larger than the width of the welding surface 12', the walls of the welding surface 12' will be melted at least partially. The melted walls of the welding surface 12' are strengthening the welding connection 28" when the material of the wall becomes solid again. Therefore, melting of the walls of the welding surface 12' is desirable, but it is emphasized that a laser pulse of such a power has to be applied, that all of the multiple strands 16 of the cable 15 and maximum 50% of the cross section of the terminal 10' is melted. If the walls, i.e. the material of the terminal, are melted in more than 50% of its cross section, it can lead to a rigid and therefore unstable welding connection. The welding connection 28" between the terminal 10' and the multiple strands 16 can be strengthened in another embodiment of the method by making a second welding connection 28'" similarly to that embodiment of the method illustrated in FIGS. 6 and 7. In this present embodiment of the laser welding method, the second welding connection 28''' can be created by the application of two further steps illustrated in FIGS. 14 and 15 after the steps of FIGS. 10 to 13.

Figure 14:
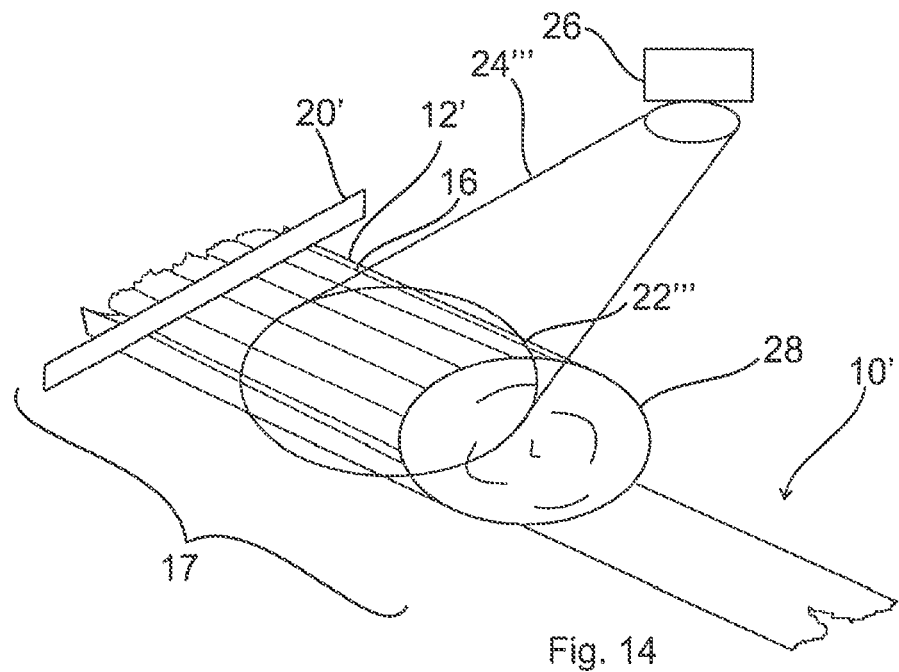
FIG. 14 is a three-dimensional schematic view illustrating a further welding step in accordance with another embodiment.

FIG. 14 shows a welding step wherein a second pulse of the laser 26 is applied on the end section 17 of the cable 15. The second pulse of the laser 26 is illustrated by a laser beam 24''' which has an impact area 22'''. The impact area 22''' is on the multiple strands 16 and the nearby parts of the terminal 10'. The diameter of the impact area 22''' of the second pulse of the laser 26 is larger than the overall width of the pressed down multiple strands 16. Impact area 22" of the first pulse of laser 26 can have an overlap or not with the impact area 22''' of the second pulse of the laser 26. In case of overlap the power of the second pulse of the laser 26 has to be larger than the power of the first pulse of the laser 26.

Figure 15:
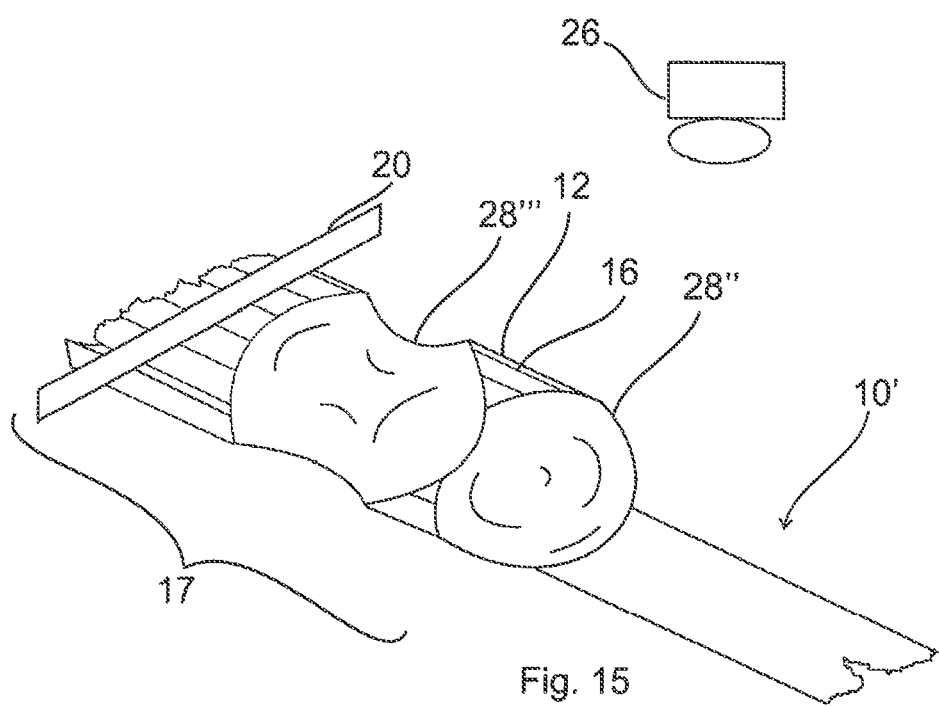
FIG. 15 is a three-dimensional schematic view illustrating a welded state obtained by the step of FIG. 14.

FIG. 15 shows a welded state, in which a second welding connection 28''' is created between the terminal 10 and the multiple strands 16. In the steps illustrated in FIGS. 11 to 15, the multiple strands 16 are pressed by means of the pressing mechanism 20', which is removed after the welding connection 28''' has been created.

Generally, it is preferred in all of the embodiments if the pulse of the laser 26 only melts the multiple strands 16 at some (point-like) location in the end section 17 of the cable 15 and the melted material of the strands constitutes the welding connections 28, 28', 28", 28''' between the strands 16 and the welding surface 12, 12'. The pressing mechanism 20, 20' in the above detailed embodiments is positioned to press down the whole section of the cable from which the insulating sheath 18 was removed and not to impede the application of the laser beam or beams. Each welding connection 28, 28', 28", 28''' is created by means of one pulse of laser 26. The pressing mechanism 20, 20' is applied on the multiple strands 16 before the appropriate pulse of the laser 26 is applied, and is removed after the welding connections 28, 28', 28", 28''' have been created.

Figure 16:
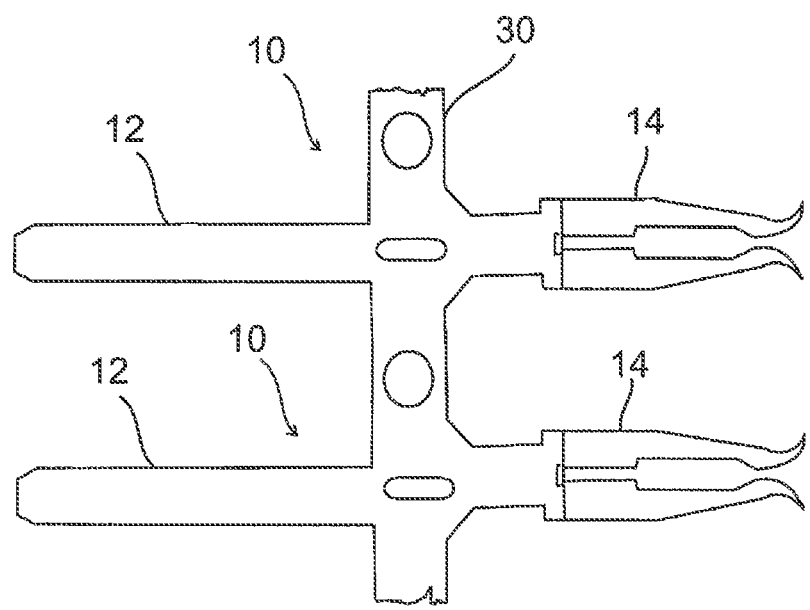
FIG. 16 is a top view of a series of a first type of terminals used in the welding method in accordance with one embodiment.
Figure 17:
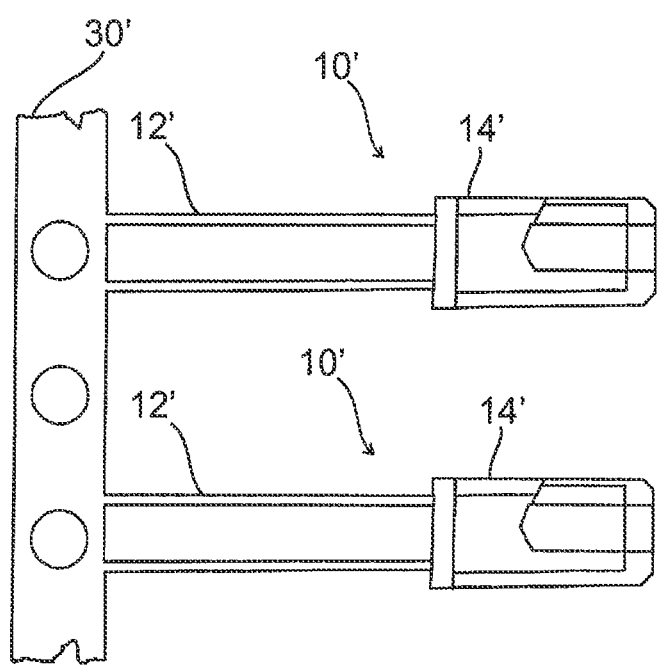
FIG. 17 is a top view of a series of a second type of terminals used in the welding method in accordance with one embodiment.

FIGS. 16 and 17 illustrate the terminals 10, 10' connected to each other by means of carrying ribbons 30, 30', respectively, in their manufactured state. Before the welding method is applied, the connection parts of the carrying ribbons 30, 30' are removed to obtain terminals 10, 10' illustrated in FIGS. 1 and 8.

A particular realization of the inventive method can be applied with the hereunder detailed dimensions. A cable of a cross section of 0.1 to 0.8 square millimeters ($mm^2$) can be used. The thickness of the welding surface can be in the range of 0.1 to 0.4 millimeters (mm), the width of the welding surface can be of any size. The diameter of the impact area of the laser beams can be chosen in the range of 0.7 to 2.5 mm, which is generally larger than the overall width of the pressed down multiple strands. By choosing a proper value for the diameter of the impact area of the laser beam, it can be ensured that the heat of the laser beam reaches the multiple strands and the terminal. It can be ensured also by proper adjustment of the diameter, that no holes appear and no part of the welding surface melts in its total width. These would be harmful on the conductance, as well as could lead to a less durable welding connection.

By these dimensions the peak power of the laser used in the method can be chosen from the range 1200 to 5400 Watts (W) and with an average power of 2000 W. A neodymium-doped yttrium aluminum garnet (NdYAG) laser with a wave length of 1064 nanometers (nm) can be used operating impulse mode with laser pulses of period of 8 to 40 milliseconds (ms) depending on the optional presence or not of tin covering of the strands. The first laser beam is applied so that the center of the beam can be chosen in a distance of 0 to 3 mm from the end of the cable. The particular value is chosen from this range so that the end of the cable is covered in any case. In a preferred case, 70% of the impact area of a first laser beam is on the strands, and 30% thereof is on the welding surface. The center of the laser beam of the second pulse can be shifted by 1 to 4 mm from the center of the first laser beam. It is also preferred that in the course of the method some inert gas, preferably argon, is applied around the terminal and the multiple strands. The application of an inert gas preferably helps to avoid oxidation of the materials constituting the welding connection.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

The invention claimed is:

1. A method of welding a cable to a terminal, wherein the cable comprises multiple strands, the method comprising the steps of:
   aligning the multiple strands on a welding surface of the terminal along a longitudinal axis of the terminal;
   pressing the multiple strands to the terminal with a pressing mechanism separate from the terminal, wherein the multiple strands are not crimped by material forming the terminal,
   making at least one welding connection between the multiple strands and the terminal by applying at least one pulse of a laser directly to an end section of the cable while pressing the multiple strands to the terminal with the pressing mechanism, wherein a first pulse of the laser is applied to the end section of the cable and a diameter of a first impact area of the first pulse of the laser is larger than an overall width of the pressed multiple strands, wherein a second pulse of the laser is applied to the end section of the cable and a diameter of a second impact area of the second pulse of the laser is larger than the overall width of the pressed multiple strands, wherein the first impact area overlaps the second impact area, and wherein a power of the second pulse of the laser is higher than a power of the first pulse of the laser; and
   removing the pressing mechanism after making the at least one welding connection between the multiple strands and the terminal.

2. The method according to claim 1, wherein the impact area of the first pulse of the laser covers the end section of the cable.

3. The method according to claim 1, wherein the first pulse of the laser is applied with such a power, that all of the multiple strands in the end section of the cable and maximum 50% of a cross section of the terminal are melted.

4. The method according to claim 1, wherein the second pulse of the laser is applied with such a power that all of the multiple strands in the end section of the cable and a maximum of 50% of a cross section of the terminal are melted.

5. The method according to claim 1, wherein the welding surface is flat.

6. The method according to claim 1, wherein the welding surface has a U-shaped cross section.

7. The method according to claim 1, wherein the terminal and all of the multiple strands are made of copper.

8. The method according to claim 1, wherein an inert gas is applied around the terminal and the multiple strands during welding.

\* \* \* \* \*